UNITED STATES PATENT OFFICE.

FREDERICK M. BECKET, OF NIAGARA FALLS, NEW YORK, ASSIGNOR TO ELECTRO METALLURGICAL COMPANY, OF NIAGARA FALLS, NEW YORK, A CORPORATION OF WEST VIRGINIA.

METHOD OF PREPARING TUNGSTEN AND ALLOYS THEREOF.

1,081,570.   Specification of Letters Patent.   Patented Dec. 16, 1913.

No Drawing.   Application filed May 26, 1913.   Serial No. 770,031.

*To all whom it may concern:*

Be it known that I, FREDERICK M. BECKET, a subject of the King of Great Britain, residing at Niagara Falls, in the county of Niagara and State of New York, have invented certain new and useful Improvements in Methods of Preparing Tungsten and Alloys Thereof, of which the following is a specification.

This invention relates to the treatment of such tungsten ores as contain material proportions of phosphorus, the object of the invention being the provision of methods whereby such ores may be utilized for the preparation of tungsten metal or alloys of low-phosphorus content. The term "ores" is herein employed to include concentrates.

I have found that certain ores of tungsten, including ferberite from Boulder county, Colorado, contain very considerable proportions of phosphorus, which in special cases may attain 0.6 to 0.7 per cent. Such ores consist largely of iron tungstate with a gangue of silicious character, the phosphorus being usually associated both with the mineral and the gangue in extremely variable proportions. Ores presenting similar conditions are wolframite, an iron tungstate containing considerable manganese, and hübnerite, an iron-manganese tungstate in which manganese largely predominates. Such ores are herein referred to as ores of the "iron-tungstate type."

According to the present method, the tungsten ore, or concentrate, is first subjected to a reducing operation, appropriate reducing-agents being for example carbon, hydrogen, carbon monoxid, producer-gas, or furnace gases having a reducing character. The reduction is effected under known conditions at a temperature below the melting-point of the reduced product, and the reduction may be either partial, approximately complete, or complete, according to circumstances. The product of this reducing operation, hereinafter referred to as the "reduced product," is next subjected to treatment for the removal of phosphorus. Preferably, this is accomplished by treatment with an acid or acid-reacting body, for example, by treating the ore with concentrated sulfuric acid in the approximate proportions of 200 centimeters of acid per kilogram of ore, as described in my copending application Serial No. 727,215, filed October 22, 1913, or as follows:—To the reduced product is added an excess of dilute sulfuric acid, say one to five per cent. concentration, and the mass is allowed to stand for some hours or is agitated with the acid solution. Moderate heating accelerates the action of the acid in removing phosphorus, but involves slight losses of tungsten by solution. The conditions are in all cases so controlled as to increase the ratio of tungsten to phosphorus. The acid is then drained off and applied to the purification of successive batches of reduced product, with such reinforcement as may be required. By this treatment a large proportion of the phosphorus is removed, and also a material percentage of the iron, the result of the removal of the iron being of course a corresponding concentration of the tungsten-content of the reduced product. Instead of the above-described acid-treatment, any other appropriate procedure for removing phosphorus may be used. In case the initial reduction of the mass was complete or substantially complete, the purified product is now melted in an electric furnace, yielding directly a commercially available low-phosphorus metal or ferroalloy, the composition of which depends upon the amount of residual iron. In case the initial reduction was partial or incomplete, the reduced product is subjected to a further or supplementary reducing operation, preferably in the electric furnace, in accordance with methods now well known to those skilled in the art, and preferably by means of a non-carbonaceous reducing agent, such as silicon, whereby there is also obtained a low-phosphorus metal or ferroalloy, which is likewise low in carbon.

I claim:—

1. The method of preparing low-phosphorus tungsten or ferrotungsten, which consists in subjecting phosphorous-bearing ores of the iron-tungstate type to a reducing operation, and treating the reduced product to increase the ratio of tungsten to phosphorus.

2. The method of preparing low-phosphorus tungsten or ferrotungsten, which consists in partially reducing ores of the iron-tungstate type, treating the reduced product to increase the ratio of tungsten to phosphorus, and thereafter completing the reduction.

In testimony whereof I affix my signature in presence of two witnesses.

FREDERICK M. BECKET.

Witnesses:
T. L. SECORD,
D. BURGESS.